US006552113B2

(12) United States Patent
Bagrodia et al.

(10) Patent No.: US 6,552,113 B2
(45) Date of Patent: *Apr. 22, 2003

(54) POLYMER-CLAY NANOCOMPOSITE COMPRISING AN AMORPHOUS OLIGOMER

(75) Inventors: Shriram Bagrodia, Kingsport, TN (US); Linda Gail Bernard, Kingsport, TN (US); Gary Wayne Connell, Church Hill, TN (US); John Walker Gilmer, Kingsport, TN (US); Tie Lan, Lake Zurich, IL (US); James Christopher Matayabas, Jr., Chandler, AZ (US); Jeffrey Todd Owens, Kingsport, TN (US); Vasiliki Psihogios, Palatine, IL (US); Emerson Eston Sharpe, Jr., Kingsport, TN (US); Sam Richard Turner, Kingsport, TN (US)

(73) Assignee: University of South Carolina Research Foundation, Columbia, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/728,954

(22) Filed: Dec. 1, 2000

(65) Prior Publication Data

US 2002/0119266 A1 Aug. 29, 2002

Related U.S. Application Data

(60) Provisional application No. 60/168,403, filed on Dec. 1, 1999.

(51) Int. Cl.[7] ............................. B32B 17/06; B32B 9/00
(52) U.S. Cl. ...................... 524/445; 524/186; 524/447; 501/148; 501/146; 501/145
(58) Field of Search ................................. 524/186, 444, 524/445, 447; 501/148, 146, 145, 35.7; 428/459

(56) References Cited

U.S. PATENT DOCUMENTS

| | | |
|---|---|---|
| 2,531,427 A | 11/1950 | Hauser |
| 2,737,517 A | 3/1956 | Boyd |
| 2,924,609 A | 2/1960 | Joyce |
| 2,938,914 A | 5/1960 | Joyce |
| 2,957,010 A | 10/1960 | Straley et al. |
| 2,966,506 A | 12/1960 | Jordan |
| 3,076,821 A | 2/1963 | Hoare |
| 3,125,586 A | 3/1964 | Katz et al. |
| 3,232,934 A | 2/1966 | Hoare |
| 3,281,434 A | 10/1966 | Turetzky et al. |
| 3,391,164 A | 7/1968 | Straley et al. |
| 3,499,916 A | 3/1970 | Berthold |
| 3,514,498 A | 5/1970 | Okazaki et al. |
| 3,544,523 A | 12/1970 | Maxion |
| 3,627,625 A | 12/1971 | Jarrett |
| 3,646,072 A | 2/1972 | Shaw |
| 3,700,398 A | 10/1972 | Cole, Jr. |
| 3,792,969 A | 2/1974 | Gertisser |
| 3,823,169 A | 7/1974 | Staub |
| 3,843,479 A | 10/1974 | Matsunami et al. |
| 3,849,406 A | 11/1974 | Basel et al. |
| 3,876,552 A | 4/1975 | Moynihan |
| 3,879,283 A | 4/1975 | Mercade |
| 3,946,089 A | 3/1976 | Furukawa et al. |
| 4,018,746 A | 4/1977 | Brinkmann et al. |
| 4,064,112 A | 12/1977 | Rothe et al. |
| 4,071,503 A | 1/1978 | Thomas et al. |
| 4,081,496 A | 3/1978 | Finlayson |
| 4,105,578 A | 8/1978 | Finlayson et al. |
| 4,116,866 A | 9/1978 | Finlayson |
| 4,133,802 A | 1/1979 | Hachiboshi et al. |
| 4,161,578 A | 7/1979 | Herron |
| 4,163,002 A | 7/1979 | Pohl et al. |
| 4,208,218 A | 6/1980 | Finlayson |
| 4,219,527 A | 8/1980 | Edelman et al. |
| 4,239,826 A | 12/1980 | Knott, II et al. |
| 4,391,637 A | 7/1983 | Mardis et al. |
| 4,393,007 A | 7/1983 | Priester et al. |
| 4,398,642 A | 8/1983 | Okudaira et al. |
| 4,410,364 A | 10/1983 | Finlayson et al. |
| 4,412,018 A | 10/1983 | Finlayson et al. |
| 4,429,079 A | 1/1984 | Shibata et al. |
| 4,434,075 A | 2/1984 | Mardis et al. |
| 4,434,076 A | 2/1984 | Mardis et al. |
| 4,442,163 A | 4/1984 | Kuhner et al. |
| 4,450,095 A | 5/1984 | Finlayson |
| 4,472,538 A | 9/1984 | Kamigaito et al. |
| 4,482,695 A | 11/1984 | Barbee et al. |

(List continued on next page.)

FOREIGN PATENT DOCUMENTS

| | | |
|---|---|---|
| DE | 278403 | 8/1988 |
| DE | 3806548 | 9/1988 |
| DE | 3808623 | 12/1988 |
| EP | 186456 | 7/1986 |
| EP | 0202532 | 11/1986 |

(List continued on next page.)

OTHER PUBLICATIONS

LeBaron et al., "Polymer–layered silicate nanocomposites: an overview," *App. Clay Sci.*, 15, 11–29 (1999).
Ke et al., "Crystallization, Properties, and Crystal and Nanoscale Morphology of PET–Clay Nanocomposites," *J. Appl. Polym. Sci.*, 71, 1139–1146 (1999).
Kawasumi et al., "Preparation and Mechincal Properties of Polypropylene–Clay Hybrids," *Macromolecules*, 30, 6333–6338 (1997).

(List continued on next page.)

*Primary Examiner*—Edward J. Cain
*Assistant Examiner*—Katarzyna W. Lee
(74) *Attorney, Agent, or Firm*—Todd Deveau; Troutman Sanders LLP

(57) ABSTRACT

This invention is directed to a polymer-clay nanocomposite, products produced from the nanocomposite, and a process for preparing a polymer-clay nanocomposite. The polymer-clay nanocomposite comprises (a) a matrix polymer, (b) an amorphous oligomer, and (c) a layered clay material.

30 Claims, No Drawings

U.S. PATENT DOCUMENTS

| | | |
|---|---|---|
| 4,517,112 A | 5/1985 | Mardis et al. |
| 4,536,425 A | 8/1985 | Hekal |
| 4,546,126 A | 10/1985 | Breitenfellner et al. |
| 4,595,715 A | 6/1986 | Kuze et al. |
| 4,600,409 A | 7/1986 | Campbell |
| 4,646,925 A | 3/1987 | Nohara |
| 4,676,929 A | 6/1987 | Rittler |
| 4,677,158 A | 6/1987 | Tso et al. |
| 4,680,208 A | 7/1987 | Aoki et al. |
| 4,720,420 A | 1/1988 | Crass et al. |
| 4,725,466 A | 2/1988 | Crass et al. |
| 4,739,007 A | 4/1988 | Okada et al. |
| 4,742,098 A | 5/1988 | Finlayson et al. |
| 4,769,078 A | 9/1988 | Tso |
| 4,777,206 A | 10/1988 | Rittler |
| 4,810,734 A | 3/1989 | Kawasumi et al. |
| 4,889,885 A | 12/1989 | Usuki et al. |
| 4,894,411 A | 1/1990 | Okada et al. |
| 4,946,365 A | 8/1990 | Kudert et al. |
| 4,957,980 A | 9/1990 | Kobayashi et al. |
| 4,983,432 A | 1/1991 | Bissot |
| 4,983,719 A | 1/1991 | Fox et al. |
| 4,994,313 A | 2/1991 | Shimizu et al. |
| 5,028,462 A | 7/1991 | Matlack et al. |
| 5,034,252 A | 7/1991 | Nilsson et al. |
| 5,037,285 A | 8/1991 | Kudert et al. |
| 5,091,462 A | 2/1992 | Fukui et al. |
| 5,102,948 A | 4/1992 | Deguchi et al. |
| 5,110,501 A | 5/1992 | Knudson, Jr. et al. |
| 5,149,485 A | 9/1992 | Belcher |
| 5,153,061 A | 10/1992 | Cavagna et al. |
| 5,153,062 A | 10/1992 | Grolig et al. |
| 5,164,440 A | 11/1992 | Deguchi et al. |
| 5,164,460 A | 11/1992 | Yano et al. |
| 5,206,284 A | 4/1993 | Fukui et al. |
| 5,221,507 A | 6/1993 | Beck et al. |
| 5,248,720 A | 9/1993 | Deguchi et al. |
| 5,273,706 A | 12/1993 | Laughner |
| 5,314,987 A | 5/1994 | Kim et al. |
| 5,334,241 A | 8/1994 | Jordan |
| 5,336,647 A | 8/1994 | Nae et al. |
| 5,340,884 A | 8/1994 | Mills et al. |
| 5,374,306 A | 12/1994 | Schlegel et al. |
| 5,382,650 A | 1/1995 | Kasowski et al. |
| 5,385,776 A | 1/1995 | Maxfield et al. |
| 5,414,042 A | 5/1995 | Yasue et al. |
| 5,429,999 A | 7/1995 | Nae et al. |
| 5,434,000 A | 7/1995 | Konagaya et al. |
| 5,514,734 A | 5/1996 | Maxfield et al. |
| 5,523,045 A | 6/1996 | Kudert et al. |
| 5,530,052 A | 6/1996 | Takekoshi et al. |
| 5,552,469 A * | 9/1996 | Beall et al. ................. 524/445 |
| 5,578,672 A | 11/1996 | Beall et al. |
| 5,612,138 A | 3/1997 | Kurz et al. |
| 5,620,774 A | 4/1997 | Etchu et al. |
| 5,648,159 A | 7/1997 | Sato |
| 5,660,761 A | 8/1997 | Katsumoto et al. |
| 5,665,454 A | 9/1997 | Hosoi et al. |
| 5,728,764 A | 3/1998 | Bauer et al. |
| 5,747,560 A * | 5/1998 | Christiani et al. ........... 523/209 |
| 5,780,376 A | 7/1998 | Gonzales et al. |
| 5,807,630 A | 9/1998 | Christie et al. |
| 5,830,544 A | 11/1998 | Kerscher et al. |
| 5,849,830 A | 12/1998 | Tsipursky et al. |
| 5,876,812 A | 3/1999 | Frisk et al. |
| 5,882,751 A | 3/1999 | Occhiello et al. |
| 5,916,685 A | 6/1999 | Frisk |
| 5,942,320 A | 8/1999 | Miyake et al. |
| 5,952,093 A | 9/1999 | Nichols et al. |
| 5,972,448 A | 10/1999 | Frisk et al. |
| 5,993,769 A | 11/1999 | Pinnavaia et al. |
| 6,017,632 A | 1/2000 | Pinnavaia et al. |
| 6,034,163 A | 3/2000 | Barbee et al. |
| 6,036,765 A | 3/2000 | Farrow et al. |
| 6,050,509 A | 4/2000 | Clarey et al. |
| 6,057,395 A | 5/2000 | Nishimura |
| 6,060,549 A | 5/2000 | Li et al. |
| 6,071,988 A | 6/2000 | Barbee et al. |
| 6,084,019 A | 7/2000 | Matayabas, Jr. et al. |
| 6,117,541 A | 9/2000 | Frisk |
| 6,120,860 A | 9/2000 | Bowen et al. |
| 6,156,835 A | 12/2000 | Anderson et al. |
| 6,162,857 A | 12/2000 | Trexler, Jr. et al. |
| 6,232,388 B1 | 5/2001 | Lan et al. |
| 6,254,803 B1 | 7/2001 | Matthews et al. |

FOREIGN PATENT DOCUMENTS

| | | | |
|---|---|---|---|
| EP | 261430 | 3/1988 | |
| EP | 295336 | 12/1988 | |
| EP | 398551 | 11/1990 | |
| EP | 459472 | 12/1991 | |
| EP | 542266 | 5/1993 | |
| EP | 0590263 | 4/1994 | |
| EP | 650994 | 5/1995 | |
| EP | 0691212 | 1/1996 | |
| EP | 0691376 | 1/1996 | |
| EP | 681990 | 11/1996 | |
| EP | 747451 | 12/1996 | |
| EP | 0761739 | 3/1997 | |
| EP | 780340 | 6/1997 | |
| EP | 0822163 | 2/1998 | |
| EP | 0846723 | 6/1998 | |
| EP | 0909787 | 4/1999 | |
| EP | 0 909 787 A1 | 4/1999 | |
| EP | 940430 | 9/1999 | |
| GB | 1090036 | 11/1967 | |
| GB | 2123014 | 1/1984 | |
| JP | 75001156 | 1/1975 | |
| JP | 75005735 | 3/1975 | |
| JP | 75005751 | 3/1975 | |
| JP | 75010196 | 4/1975 | |
| JP | 76029697 | 3/1976 | |
| JP | 62073943 | 4/1987 | |
| JP | 7026123 | 1/1995 | |
| JP | 09048908 | 2/1997 | |
| JP | 9176461 | 7/1997 | |
| JP | 9217012 | 8/1997 | |
| JP | 1001608 | 1/1998 | |
| JP | 10077427 | 3/1998 | |
| JP | 10133013 | 5/1998 | |
| JP | 10168305 | 6/1998 | |
| WO | WO 84/03096 | 8/1984 | |
| WO | WO 93/04117 | 3/1993 | |
| WO | WO 93/04118 | 3/1993 | |
| WO | WO 93/04118 A1 * | 3/1993 | ............ C08K/9/04 |
| WO | WO 93/04125 | 3/1993 | |
| WO | WO 93/11190 | 6/1993 | |
| WO | WO 93/14922 | 8/1993 | |
| WO | WO 94/11430 | 5/1994 | |
| WO | WO 94/29378 | 12/1994 | |
| WO | WO 95/06090 | 3/1995 | |
| WO | WO 95/14733 | 6/1995 | |
| WO | WO 96/08526 | 3/1996 | |
| WO | WO 96/25458 | 8/1996 | |
| WO | WO 97/17398 | 5/1997 | |
| WO | WO 97/30950 | 8/1997 | |
| WO | WO 97/31057 | 8/1997 | |
| WO | WO 97/31973 | 9/1997 | |
| WO | WO 97/44384 | 11/1997 | |
| WO | WO 98/01346 | 1/1998 | |
| WO | WO 98/29499 | 7/1998 | |

| WO | WO 98/53000 | 11/1998 |
| WO | WO 99/02593 | 1/1999 |
| WO | WO 99/15432 | 4/1999 |
| WO | WO 99/41299 | 8/1999 |
| WO | WO 0034378 | 6/2000 |
| WO | WO 0034393 | 6/2000 |

OTHER PUBLICATIONS

Usuki et al., "Synthesis of Propylene–Clay Hybrid", *J. Appl. Polym. Sci., 63*, 137–139 (1997).

Giannelis, "Polymer Layered Silicate Nanocomposites," *Advanced Materials, 8*, 29–35 (1996).

Kurowaka et al., "Preparation of a nanocomposite of polypropylene and smeccite," *J. Material Science Letters*, 15, 1481–1483 (1996).

Oriakhi et al., "Incorporation of poly(acrylic acid), poly(vinylsulfonate) and poly(styrenesulfonate) within layered double hydroxides," *J. Mater. Chem., 6*, 103–107 (1996).

Messersmith et al., "Syntheses and Barrier Properties of Poly(ε–Caprolactone)–Layered Silicate Nanocomposites," *J. of Polym. Sci., 33*, 1047–1057 (1995).

Pinnavaia et al., "Clay–Reinforced Epoxy Nanocomposites," *Chem. Mater., 6*, 2216–2219 (1994).

Sugahara et al., "Clay–Organic Nano–Composite; Preparation of a Kaolinite—Poly(vinylpyrrolidone) intercalation Compound," *J. of Ceramic Society of Japan, 100*, 413–416 (1992).

Yano et al., "Synthesis and properties of polyimide–clay hybrid," *ACS, Polymer Preprints*, 32, 65–66, (1991).

Fukushima et al., "Swelling Behavior of Montmorillonite by Poly–6–Amide," *Clay Minerals, 23*, 27–34 (1988).

Verbicky, *Encyclopedia of Polymer Science and Engineering*, 2nd Edition, 12, 364–383 (1988).

Fukushima et al., "Synthesis of an Intercalated Compound of Montmorillonite and 6–Polyamide,"—*J. Inclusion Phenomena, 5*, 473–482 (1987).

Okada et al., "Synthesis and Characterization of a Nylon 6–Clay Hybrid," *ACS, Polymer Preprints, 28*, 447–448, (1987).

Fahn et al., "Reaction Products of Organic Dye Molecules with Acid–Treated Montmorillonite," *Clay Minerals, 18*, 447–458 (1983).

Greenland, "Adsorption of Polyvinly Alcohols by Montmorillonite," *J. Colloid Sci., 18*, 647–664 (1963).

* cited by examiner ental patent application Ser. No. 60/168,403, filed Dec. 1, 1999, which is incorporated herein by reference in its entirety.

FIELD OF THE INVENTION

This invention relates to a nanocomposite composition comprising a matrix polymer, preferably a polyamide, at least one amorphous oligomeric resin, and a layered clay material uniformly dispersed therein. This invention also relates to articles produced from the nanocomposite and processes for producing the nanocomposite.

BACKGROUND OF THE INVENTION

Polymer-clay composites have received much attention lately due to their potential to improve polymer properties, including gas barrier, heat deflection temperature, and modulus. It has been found that polymer-clay composites often exhibit rapid crystallization that has been attributed to nucleation of the polymer matrix by the clay. This characteristic can be an advantage for opaque, crystalline molded parts with improved heat resistance and modulus such as the nylon composites disclosed in U.S. Pat. Nos. 5,385,776 and 4,739,007 and PET composites discussed in Journal of Applied Polymer Science, Vol. 71 (1999), pg. 1139–1146. However, the rapid crystallization of polymer-clay composites hinder their use in applications in which rapid crystallization is not desired, including, but not limited to profile extrusion, extrusion blow molding, stretch blow molding, film extrusion, and blown film. The rapid crystallization of polymer-clay composites makes it difficult, if not impossible, to obtain clear parts and greatly reduces the available processing window.

U.S. Pat. No. 4,739,007 discloses composite materials comprising a polyamide matrix polymer and a well dispersed layered silicate material that has been treated with monomeric components of the polyamide, then subjected to subsequent polymerization, which imparts high mechanical strength and excellent high temperature properties. U.S. Pat. No. 4,889,885 discloses composite materials comprising mixing non-polyamide matrix polymers and a well dispersed silicate material that has been treated with a monomer and/or oligomer of a resin other than a polyamide resin, and a polymerization step of polymerizing said monomer and/or oligomer in the mixture formed in the mixing step.

U.S. Pat. No. 5,385,776 discloses composite materials comprising a Nylon-6 matrix and a minor amount of a layered silicate material that is incorporated during melt extrusion and imparts rapid nucleation of the polyamide into the gamma crystal structure thereby improving modulus and resistance to plasticization by water.

U.S. Pat. No. 4,810,734 discloses nylon composites comprising a layered silicate material that has been treated with certain organic ammonium compounds and incorporated by synthesis using a dispersing aid.

PCT application WO 93/04117 discloses composite materials comprising a polyamide matrix and a layered silicate material that has been modified with certain primary or secondary organic ammonium compounds incorporated during melt extrusion to impart improved modulus to the polymer composite.

Journal of Applied Polymer Science, Vol. 71 (1999), pg. 1139–1146, discloses the rapid crystallization of composite materials comprising a polyethylene terephthalate matrix and an undisclosed clay material.

PCT application WO 93/11190 discloses Nylon composites comprising a layered silicate material that has been treated with certain organic ammonium compounds then with certain silane compounds and incorporated by melt blending.

MXD6 is a commercially available, partially aromatic, semi-crystalline nylon resin prepared from adipic acid and meta-xylylene diamine, and is also available as a copolyamide having comonomers including isophthalic acid. MXD6 and its co-polyamides are preferred barrier materials for use in multilayer PET bottles due to their similar processing conditions and rheology to PET and due to their improved resistance to delamination from PET compared to EVOH. Although MXD6 crystallizes more rapidly than PET, its crystallization rate is just slow enough to permit the manufacture of multilayer bottles. Nevertheless, because the oxygen barrier of MXD6 is only 10–40 times the oxygen barrier of PET, further improvements in the gas barrier properties of MXD6 containing materials are desirable.

During this work it was found that MXD6-clay composites, for example, can significantly improve oxygen barrier and, therefore, provide multilayer bottles with improved barrier and/or permit the preparation of high-barrier multilayer bottles comprising thin layers of the barrier material, which reduces raw material cost and improves recyclability. However, it was also found that many MXD6-clay composites crystallize more rapidly than clay-free MXD6, which makes the preparation of bottles more difficult and sometimes impossible. For many MXD6 clay composites, it was found that as the clay loading and resulting gas barrier properties increase, the crystallization rate of the polymer becomes more rapid. It is, therefore, desirable to significantly improve the gas barrier properties of MXD6 using nanocomposite technology without increasing the crystallization rate compared to that of neat MXD6.

It is an objective of this invention to overcome the nucleating effect caused by the presence of clay platelet particles and to provide polymer-clay composites that have the benefits of the improved properties afforded by the incorporation of clay platelet particles, but remain readily processible for a wide variety of applications.

SUMMARY OF THE INVENTION

Surprisingly, we have found that when certain amorphous oligomeric resins are used to treat clays, the increase in the crystallization rate of the matrix polymer material is lessened, and in some instances reversed. Further, the use of amorphous oligomeric resins have been found to provide additional benefits, including improved processability in blow-molding applications, improved adhesion, improved recyclability, improved color, improved barrier, improved clarity, and/or their combinations.

Therefore, as embodied and broadly described herein, this invention, in one embodiment, relates to a polymer-clay nanocomposite comprising (i) a matrix polymer,
(ii) an amorphous oligomer, and
(iii) a layered clay material.

In another embodiment, the invention relates to a polyamide-clay nanocomposite comprising:

(i) a high molecular weight matrix polyamide, and incorporated therein
(ii) a layered clay material, wherein the clay material is dispersed in a matrix polyamide-compatible amorphous oligomeric resin.

In another aspect, this invention relates to a process for preparing a polymer-clay nanocomposite comprising the steps of:

(a) melt mixing a layered clay material with a matrix polymer-compatible amorphous oligomeric resin, to form an oligomeric resin-clay composite; and (b) mixing the oligomeric resin-clay composite with a high molecular weight matrix polymer to produce the polymer-clay nanocomposite material.

In yet another aspect, the invention relates to a process for preparing polymer-clay nanocomposite comprising melt mixing a layered clay material, an amorphous oligomeric resin, and a matrix polymer, to produce the polymer-clay nanocomposite material.

Additional advantages of the invention will be set forth in part in the detailed description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Definitions

It must also be noted that, as used in the specification and the appended claims, the singular forms "a," "an" and "the" include plural referents unless the context clearly dictates otherwise. For example, reference to an "article," "container" or "bottle" prepared from the nanocomposite and process of this invention is intended to include the processing of a plurality of articles, containers or bottles.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Whenever used in this specification and claims, the terms set forth shall have the following meanings:

"Layered clay material," "layered clay," "layered material" or "clay material" shall mean any organic or inorganic material or mixtures thereof, such as a smectite clay mineral, which is in the form of a plurality of adjacent, bound layers. The layered clay comprises platelet particles and is typically swellable.

"Platelets," "platelet particles," "clay particles" or "particles" shall mean individual or aggregate unbound layers of the layered material. These layers may be in the form of individual platelet particles, ordered or disordered small aggregates of platelet particles (tactoids), and/or small aggregates of tactoids.

"Dispersion" or "dispersed" is a general term that refers to a variety of levels or degrees of separation of the platelet particles. The higher levels of dispersion include, but are not limited to, "intercalated" and "exfoliated."

"Intercalated" or "intercalate" shall mean a layered clay material that includes treated or organically modified layered clay material having an increase in the interlayer spacing between adjacent platelets particles and/or tactoids.

"Exfoliate" or "exfoliated" shall mean platelets dispersed mostly in an individual state throughout a carrier material, such as a matrix polymer. Typically, "exfoliated" is used to denote the highest degree of separation of platelet particles.

"Exfoliation" shall mean a process for forming an exfoliate from an intercalated or otherwise less dispersed state of separation.

"Nanocomposite" shall mean a composition or residue comprising a polymer or copolymer having dispersed therein a plurality of individual platelets obtained from a layered clay material.

"Matrix polymer" or "matrix polyamide" shall mean a thermoplastic or thermosetting polymer or polyamide in which the clay material is dispersed to form a nanocomposite.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH2CH2O— repeat units in the polyester, regardless of whether ethylene glycol is used to prepare the polyester. Similarly, a sebacic acid residue in a polyester refers to one or more —CO(CH2)8CO— moieties in the polyester, regardless of whether the residue is obtained by reacting sebacic acid or an ester thereof to obtain the polyester.

A "residue" of a chemical composition, as used in the specification and concluding claims, refers to the final composition or product that is produced by a process for preparing the composition or product from starting materials of identifiable composition, regardless of whether the residue contains, after its formation, identifiable amounts of the unchanged starting materials. In other words, a residue of a chemical formulation or composition may refer to the product produced by the relevant process, even though the starting materials of the process may dissociate, mix, react, or otherwise become changed during the process for preparing the residue. For example, the residue of a composition formed by a process of mixing an aqueous solution comprising HCl and aqueous solution comprising NaOH would refer to the final composition formed (comprising water and salt (NaCl)), regardless of whether the final composition contained HCl or NaOH. In a further example, the residue of a composition formed by a process of mixing a layered clay material comprising a Wyoming type bentonite and an amorphous oligomer would refer to the composition formed, regardless of whether the final composition contained identifiable or unchanged Wyoming-type bentonite.

Description of the Embodiments

In one embodiment, this invention relates to a composite material comprising at least one amorphous oligomeric resin, and clay platelet particles uniformly dispersed therein and products produced from the composite.

In other embodiments, this invention relates to a polymer-clay nanocomposite comprising:
  (i) a matrix polymer;
  (ii) an amorphous oligomer; and
  (iii) a layered clay material, or a residue thereof.

Nevertheless, in certain embodiments, the nanocomposites of the invention are not a polyamide-clay nanocomposite comprising:
  (a) an amorphous matrix polyamide comprising (i) a residue of a dicarboxylic acid component comprising at least one diacid and (ii) a residue of at least one diamine component, and
  (b) a layered clay material, wherein the clay material is dispersed in the matrix polyamide.

Similarly, in certain other embodiments, the polymer-clay nanocomposite does not comprise
  (i) an amorphous matrix polyamide comprising (i) a residue of at least one dicarboxylic acid component and (ii) a residue of at least one diamine component; or poly(m-xylene adipamide) or
  (ii) an amorphous matrix polyamide-compatible oligomeric resin, or oligomeric (m-xylene adipamide).

In some embodiments, the polymer clay nanocomposite does not simultaneously comprise (i) and (ii) as described immediately above.

In yet other embodiments, the nanocomposites of this invention are not a polyamide-clay nanocomposite comprising
  (a) an amorphous matrix polyamide comprising (i) a residue of at least one dicarboxylic acid component and (ii) a residue of a diamine component, and
  (b) a layered clay material, wherein the layered clay material is dispersed in an amorphous matrix polyamide-compatible oligomeric resin and wherein the clay-oligomer resin dispersion is incorporated into the matrix polyamide.

In some embodiments, the invention relates to a process for preparing a polymer-clay nanocomposite comprising the steps of:
  (a) melt mixing a layered clay material with an amorphous oligomeric resin, to form an oligomeric resin-clay composite; and
  (b) mixing the oligomeric resin-clay composite with a matrix polymer to produce the polymer-clay nanocomposite;

In some embodiments, the invention relates to a process for preparing a polymer-clay nanocomposite comprising the steps of:
  (a) melt mixing a layered clay material with an amorphous oligomeric resin to form an oligomeric resin-clay composite, and
  (b) mixing the oligomeric resin-clay composite with a high molecular weight matrix polymer and producing a nanocomposite material.

As with the compositions of the invention, some embodiments of the processes of this invention do not comprise (i) preparing a low molecular weight version (oligomer) of an amorphous high barrier polyamide with either amino or diacid end groups by unbalancing the polymerization stoichiometry for the melt phase step-growth polycondensation, and (ii) melt mixing the oligomer with the clay material.

Moreover, in some embodiments of the processes of the invention, the polymer-clay nanocomposite does not simultaneously comprise
  (i) an amorphous matrix polyamide comprising (i) a residue of at least one dicarboxylic acid component and (ii) a residue of at least one diamine component; or poly(m-xylylene adipamide) and
  (ii) an amorphous matrix polyamide-compatible oligomeric resin, or oligomeric (m-xylylene adipamide).

Typically, the layered clay material (typically a silicate) is treated with various agents as described hereinbelow to enhance dispersibility of the layered clay material to form platelet particles dispersed in the composite. Nanocomposite compositions produced according to the present invention are especially useful for preparing clear bottles and film that exhibit improved gas barrier properties.

By virtue of their reduced tendency to crystallize, nanocomposite compositions produced according to the present invention are unexpectedly more processable than conventional polymer-clay compositions. Additionally, products produced from the nanocomposites can achieve lower haze (especially when oriented), higher gas barrier properties, and better adhesion in multilayer films than products produced from conventional polymer-clay composites.

The prior art has defined the degree of separation of clay (platelet particles) based on peak intensity and basal spacing value, or lack of predominant basal spacing, as determined by X-ray analyses of polymer-platelet particle composites. Even though X-ray analysis alone often does not unambiguously predict whether the platelet particles are individually dispersed in the polymer, it can often allow quantification of the level of dispersion achieved. Basal spacing by X-ray diffraction indicates the separation distance of a platelet in a tactoid rather than single platelets. X-ray diffraction intensity (basal spacing peak height) may correlate to barrier in an article resulting from a nanocomposite including a clay material. For example, a low basal spacing peak height indicates few tactoids; therefore, the remainder must be either individual platelets or tactoids that are disordered.

Moreover, in polymer nanocomposites, X-ray analysis alone does not accurately predict either the dispersion of the platelet particles in the polymer or the resultant gas barrier improvement. TEM images of polymer-platelet composites show that platelet particles which are incorporated into at least one polymer exist in a variety of forms, including, but not limited to, individual platelets (the exfoliated state), disordered agglomerates of platelets, well ordered or stacked aggregates of platelets (tactoids), swollen aggregates of stacked platelets (intercalated tactoids), and aggregates of tactoids.

Without being bound by any particular theory, it is believed that the degree of improved gas barrier (permeability) depends upon the embodiment ratio of the resulting particle platelets and aggregates, the degree to which they are dispersed or uniformly distributed, and the degree to which they are ordered perpendicular to the flux of the permeant.

To obtain the improvements in gas permeability according to the present invention, it is preferable that the platelet particles representative of the bulk of the composite be exfoliated, and preferably be highly exfoliated, in the matrix polymer such that the majority, preferably at least about 75 percent and perhaps as much as at least about 90 percent or more of the platelet particles, be dispersed in the form of individual platelets and small aggregates having a thickness in the shortest dimension of less than about 30 nm and preferably less than about 10 nm, as estimated from TEM images. Polymer-platelet nanocomposites containing more individual platelets and fewer aggregates, ordered or disordered, are most preferred.

Significant levels of incomplete dispersion (i.e., the presence of large agglomerates and tactoids greater than about 30 nm) not only lead to an exponential reduction in the potential barrier improvements attributable to the platelet particles, but also can lead to deleterious affects to other properties inherent to polymer resins such as strength, toughness, heat resistance, visual clarity, and processability.

Again, without being bound by a particular theory, it is believed that delamination of platelet particles upon melt processing or mixing with a polymer requires favorable free energy of mixing, which has contributions from the enthalpy of mixing and the entropy of mixing. Melt processing clay with polymers results in a negative entropy of mixing due to the reduced number of conformations, which are accessible to a polymer chain when it resides in the region between two layers of clay. It is believed that poor dispersion is obtained using melt-processible polyesters, for example, because the enthalpy of mixing is not sufficient to overcome the negative entropy of mixing. In contrast, generally good dispersions are obtained with polyamides due to their hydrogen bonding character. However, the extent of this dispersion is frequently lessened because of the negative entropy of mixing.

Moreover, as described above, many prior art polyamide nanocomposites comprising clay particles induce rapid crystallization. Without being bound by any particular theory, it is believed that the processing of prior art polymer/clay nanocomposites, such as stretching or orientation of the films, leads to very high levels of haze from crystallization of the matrix polymer around the dispersed particles, which renders the polymer nanocomposites undesirable for food packaging application. This crystallization phenomena can even lead to void and hole formation in the polymer films, which destroys the usefulness of these compositions in barrier applications.

Regarding the present invention, it has been found that processing a matrix polymer, preferably a polyamide, an amorphous oligomer, preferably an oligomeric amorphous polyamide, and a layered clay material gives a good dispersion of platelet particles in a resulting polymer nanocomposite, creating dispersed clay domains containing mostly individual platelet particles. The resulting nanocomposite has improved barrier to gas when formed into a wall or article compared to a neat polymer formed into the same or similar structure. In addition, these nanocomposites having an amorphous oligomer has been found to show unexpected resistance to haze formation, crystallization, and other defect formation in the presence of dispersed and/or exfoliated organically modified clays when undergoing orientation and/or other film processing steps.

Measurement of peak temperatures for crystallization on cooling ($T_{cc}$) and crystallization on heating ($T_{ch}$) by DSC is a useful tool for rapidly determining, qualitatively, the relative rates of crystallization by comparison of $T_{cc}$–$T_{ch}$. The greater the value of $T_{cc}$–$T_{ch}$, the faster the material crystallizes. Conversely, the lower the value of $T_{cc}$–$T_{ch}$, the slower the material crystallizes, and the absence of a $T_{cc}$ and/or $T_{ch}$ is indicative of crystallization that is much slower than the time scale of the DSC measurement, which typically uses a scan rate of about 5–20° C./min. This method is useful for comparing composite compositions comprising the same matrix polymer material. The rates of heating and cooling are both 20° C./min for the $T_{cc}$ and $T_{ch}$ values given in this document.

Matrix Polymers

Any melt-processible matrix polymer may be used in this invention. Illustrative of melt-processible polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrenes, polyethylene-co-vinyl alcohols (EVOH), and the like or their combinations and blends. Although the preferred polymers are linear or nearly linear, polymers with other architectures, including branched, star, cross-linked and dendritic structures, may be used if desired. The matrix polymers may be crystalline, semi-crystalline, or amorphous.

The preferred matrix polymers include those materials that are suitable for use in the formation of multilayer structures with polyesters, and include polyesters, polyamides, polyethylene-co-vinyl alcohols (such as EVOH), and similar or related polymers and/or copolymers. The most preferred matrix polymer is a polyamide and/or its copolymers.

Any polyamide may be used as a matrix polymer in the processes of this invention. In some embodiments, the polyamides include partially aromatic polyamides, aliphatic polyamides, wholly aromatic polyamides and/or mixtures thereof. By "partially aromatic polyamide," it is meant that the amide repeat units of the partially aromatic polyamide have at least one aromatic ring and at least one non-aromatic species bonded thereto.

Preferred matrix polymers have an article forming molecular weight, preferably a number average molecular weight of greater than about 10,000 g/mole, and/or preferably an inherent viscosity ("I.V.") of greater than 0.5, up to about 1.5 dL/g. The matrix polymers of the present invention preferably exhibit an I.V. about 0.6 to about 1.2 dL/g, and more preferably of about 0.7 to about 0.9 dL/g. The I.V. is measured at 25° C. in a 60/40 percent by weight mixture in phenol/1,1,2,2-tetrachloroethane at a concentration of 0.5 grams per 100 ml. Polymers having an I.V. within the ranges specified above are of sufficiently high molecular weight to be used in the formation of the articles of the present invention.

Preferred wholly aromatic polyamides comprise in the matrix polymer chains at least 70 mole % of structural units derived from m-xylylene diamine or a xylylene diamine mixture comprising m-xylylene diamine and up to 30% of p-xylylene diamine and an aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75, which are hereby incorporated by reference in their entirety.

Polyamides formed from isophthalic acid, terephthalic acid, cyclohexanedicarboxylic acid, meta-orpara-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used.

Polyamide matrix co-polymers which may be used in the invention include the amorphous matrix polyamide co-polymers described WO 00/34372, entitled "A High Barrier Amorphous Polyamide-Clay Nanocomposite and A Process for Preparing Same," published Jun. 15, 2000. The disclosure WO 00/34372 is hereby incorporated herein by reference in its entirety, particularly for its disclosure of certain amorphous matrix polyamides and co-polyamides, their properties, and methods for their preparation, and their use in forming nanocomposite compositions. The amorphous polyamides may comprise the polycondensation polymerization reaction product (or residue) of a diamine component and at least one dicarboxylic acid component.

The dicarboxylic acid component of the amorphous polyamides may comprise a first diacid and preferably a second diacid. The diacids may be in any ratio of mole percent of the total diacid moieties present in the amorphous polyamide. Preferably, one of the diacids is present in an amount of about 10 to about 90 mole percent of the total diacid moieties present in the polyamide, more preferably of about 45 to about 85 and even more preferably about 50 to about 80 mole percent of the total diacid moieties present in the polyamide.

The dicarboxylic acids of the amorphous polyamides include, but are not limited to dicarboxylic acids having from 3 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, and/or cycloaliphatic dicarboxylic acids preferably having 8 to 12 carbon atoms.

In one embodiment of the amorphous polyamides, the diacid component may be defined by formula (I):

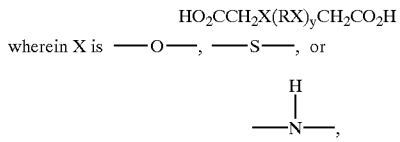
(I)

wherein X is —O—, —S—, or $$-\underset{\underset{H}{|}}{N}-,$$

Y is 0 or 1, and R is an aromatic moiety comprising 6 to about 13 carbon atoms. Suitable R groups include, but are not limited to the following:

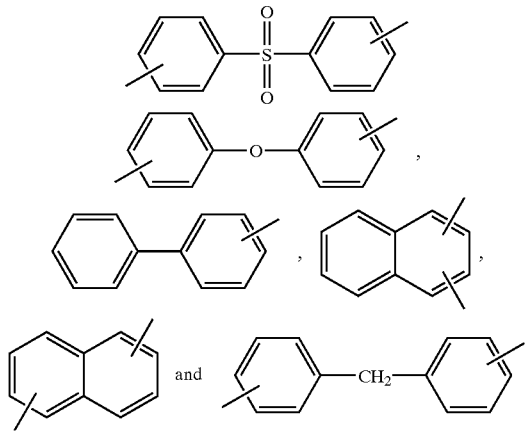

Preferably, in the embodiment as defined by formula (I), the dicarboxylic acid component comprises iminodiacetic acid, oxydiacetic acid, thiodiacetic acid, 1,4-phenylenedioxydiacetic acid, 1,3-phenylenedioxydiacetic acid, etc., or mixtures thereof.

Examples of further suitable dicarboxylic acids include, but are not limited to phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi(oxyacetic acid), sebacic acid, succinic acid, adipic acid, glutaric acid, azelaic acid, and the like.

The diamine component of the amorphous polyamides comprises an aliphatic diamine having about 2 to about 12 carbon atoms. The aliphatic diamines may contain aromatic groups, as long as an alkylene group (e.g., a methylene group) is interposed between an amino group and an aromatic ring. The aliphatic diamines also include cycloaliphatic diamines such as piperazine. Examples of suitable aliphatic diamines include, but are not limited to 1,2-ethylenediamine, 1,3-propylenediamine, 1,6-hexamethylenediamine, 1,12-dodecylenediamine, 1,4-cyclohexanebismethylamine, piperazine, or mixtures thereof. The diamine component of this invention may also comprise partially aromatic diamines such as, p-xylylenediamine, and m-xylylenediamine, or mixtures thereof. More preferably, the partially aromatic dimines comprise m-xylylenediamine.

Other diamines or mixtures of diamines can also be used with the preferred diamine (m-xylylenediamine) to form the amorphous polyamide. Some representative polyamides of this invention include, but are not limited to those shown in Table 1.

TABLE 1

| Example | Polyamide | I.V. | $T_g$ (° C.) | $T_m$ (° C.) |
|---|---|---|---|---|
| a | PDA(MX) | 0.522 | 96.7 | None |
| b | PDA-10-TPA(MX) | 0.403 | 101.1 | None |
| c | PDA-10-NDA(MX) | 0.390 | 101.1 | None |
| d | A-19-IPA(MX) | 0.828 | 104.1 | None |
| e | A-18-TPA(MX) | 0.778 | 103.8 | None |
| f | A-18-NDA(MX) | 0.798 | 106.3 | None |
| g | A-19-PIDA(MX) | 0.498 | 109.6 | None |

The preferred amorphous high barrier matrix polyamides of this invention may comprise the reaction product or residue of a dicarboxylic acid component comprising at least two of adipic acid (A), 2,6-napthalene dicarboxylic acid (NDA), isophthalic acid (IPA), terephthalic acid (TPA), 1,3-phenylenedioxydiacetic acid (PDA), 1,4-cyclohexanedicarboxylic acid (CHDA), and phenylindane dicarboxylic acid (PIDA), and a diamine component comprising m-xylylenediamine (MX). The combination of at least two of the diacids with the diamine effectively disrupts the crystallization tendency of these macromolecules to allow clear transparent amorphous structures to be maintained throughout the processing steps. Using more than one diamine with one diacid may form an amorphous polyamide. Also, using more than one diacid and more than one diamine may form an amorphous polyamide. MX is the preferred diamine due to its high barrier properties.

Referring to Table 1, PDA(Mx) means 100 mol % PDA with 100 mol % MX; PDA-10-TPA(MX) means 90 mol % PDA and 10 mol % TPA with 100 mol % MX; PDA-10-NDA(MX) means 90 mol % PDA and 10 mol % NDA with 100 mol % MX; A-19-IPA(Mx) means 81 mol % A and 19 mol % IPA with 100 mol % MX; A-18-TPA(MX) means 82 mol % A and 18 mol % TPA with 100 mol % MX; A-18-NDA(MX) means 82 mol % A and 18 mol % NDA with 100 mol % MX; A-18-PIDA(MX) means 82 mol % A and 18 mol % PIDA with 100 mol % MX.

The polyamides of the invention may also contain small amounts of trifunctional or tetrafunctional comonomers such as trimellitic anhydride, pyromellitic dianhydride, or other polyamide forming polyacids and polyamines known in the art.

Preferred partially aromatic polyamides include, but are not limited to poly(m-xylylene adipamide, poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-coterephthalamide), poly(hexamethylene isophthalamide-co-terephthalamide) and the like or mixtures thereof. More preferred partially aromatic polyamides include, but are not limited to poly(m-xylylene adipamide), poly(hexamethylene isophthalamide-co-terephthalamide), poly(m-xylylene adipamide-co-isophthalamide), and/or mixtures thereof. The most preferred partially aromatic polyamide is poly(m-xylylene adipamide).

Preferred aliphatic polyamides include, but are not limited to poly(hexamethylene adipamide) and poly(caprolactam). The most preferred aliphatic polyamide is poly (hexamethylene adipamide). Partially aromatic polyamides are preferred over the aliphatic polyamides where good thermal properties are crucial.

Preferred aliphatic polyamides include, but are not limited to polycapramide (nylon 6), poly-aminoheptanoic acid (nylon 7), poly-aminonanoic acid (nylon 9), polyundecane-amide (nylon 11), polylaurylactam (nylon 12), poly (ethylene-adipamide) (nylon 2,6), poly(tetramethylene-adipamide) (nylon 4,6), poly(hexamethylene-adipamide) (nylon 6,6), poly(hexamethylene-sebacamide) (nylon 6,10), poly(hexamethylene-dodecamide) (nylon 6,12), poly (octamethylene-adipamide) (nylon 8,6), poly (decamethylene-adipamide) (nylon 10,6), poly (dodecamethylene-adipamide) (nylon 12,6) and poly (dodecamethylene-sebacamide) (nylon 12,8).

The most preferred polyamides include poly(m-xylylene adipamide), polycapramide (nylon 6) and poly (hexamethylene-adipamide) (nylon 6,6) poly (hexamethylene isophthalamide-co-terephthalamide), poly (m-xylylene adipamide-co-isophthalamide), and the like or mixtures thereof Poly(m-xylylene adipamide) is a preferred polyamide due to its availability, high barrier, and process-ability. Partially aromatic polyamides are preferred for use in bottles due to their high gas barrier properties.

The amorphous polyamides are generally prepared by processes which are well known in the art, including those disclosed in WO 00/34372, which are hereby incorporated by reference in their entirety.

Suitable polyesters include at least one dibasic acid and at least one glycol. The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used, but the 1,4-, 1,5-, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

The matrix polyester may be prepared from one or more of the following dicarboxylic acids and one or more of the following glycols.

The dicarboxylic acid component of the polyester may optionally be modified with up to about 50 mole percent of one or more different dicarboxylic acids. Such additional dicarboxylic acids include dicarboxylic acids having from 3 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of suitable dicarboxylic acids include phthalic acid, isophthalic acid, naphthalene-2,6-dicarboxylic acid, cyclohexanedicarboxylic acid, cyclohexanediacetic acid, diphenyl-4,4'-dicarboxylic acid, phenylene (oxyacetic acid) succinic acid, glutaric acid, adipic acid, azelaic acid, sebacic acid, and the like. Polyesters may also be prepared from two or more of the above dicarboxylic acids.

Typical glycols used in the polyester include those containing from two to about ten carbon atoms. Preferred glycols include ethylene glycol, propanediol, 1,4-butanediol, 1,6-hexanediol, 1,4-cyclohexanedimethanol, diethylene glycol and the like. The glycol component may optionally be modified with up to about 50 mole percent, preferably up to about 25 mole percent, and more preferably up to about 15 mole percent of one or more different diols. Such additional diols include cycloaliphatic diols preferably having 3 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1, 3), hexanediol-(1,3), 1,4-di-(2-hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. Polyesters may also be prepared from two or more of the above diols.

Small amounts of multifunctional polyols such as trimethylolpropane, pentaerythritol, glycerol and the like may be used, if desired. When using 1,4-cyclohexanedimethanol, it may be the cis, trans or cis/trans mixtures. When using phenylenedi(oxyacetic acid), it may be used as 1,2; 1,3; 1,4 isomers, or mixtures thereof.

The polymer may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, pyromellitic acid and other polyester forming polyacids or polyols generally known in the art.

Although not necessarily preferred, the polymers of the present invention may also include additives normally used in polymers. Illustrative of such additives known in the art are colorants, pigments, carbon black, glass fibers, fillers, impact modifiers, antioxidants, stabilizers, flame retardants, reheat aids, crystallization aids, acetaldehyde reducing compounds, recycling release aids, oxygen scavengers, plasticizers, nucleators, mold release agents, compatibilizers, and the like, or their combinations.

All of these additives and many others and their use are known in the art and do not require extensive discussion. Therefore, only a limited number will be referred to, it being understood that any of these compounds can be used in any combination so long as they do not hinder the present invention from accomplishing its objectives.

Amorphous Oligomers

Any amorphous oligomer (which may alternatively be termed an amorphous oligomeric resin) may be used in the nanocomposite or process of this invention, provided that the amorphous oligomer has sufficient compatibility with the matrix polymer to provide the desirable crystallization rate and barrier improvement in the final nanocomposite.

"Amorphous", as used for this invention, means that the oligomer (or matrix polymer) does not show a melting on crystallization peak on a second DSC scan at a rate of 20° C./min. Typically, an amorphous oligomer composition is characterized by a high degree of transparency (clarity) and a lack of a sharply defined melting point. The preferred amorphous matrix polymers or amorphous oligomers are those with ΔH of fusion less than about 5 cal/g, preferably less than 3 cal/g and more preferably less than about 1 cal/g, as measured on the second cycle at a scan rate of about 20°

C./min. Certain amorphous matrix polymers and oligomers have been found to provide additional benefits, including improved adhesion, improved recyclability, improved color, improved barrier, improved clarity, and their combinations.

"Oligomers" or "oligomeric resins" are typically low molecular weight versions of a high molecular weight matrix polymer. It is to be understood that "Oligomers" or "oligomeric resins" typically do not include any substantial concentrations of purely monomeric, or dimeric polymer precursors that are generated during the initial phases of preparation of the high molecular weight matrix polymer. For example, an "oligomer" of polyethylene terephthalate includes at most minor amounts of terephthalic acid, dimethyl terephatalate, ethylene glycol, ethylene glycol diacetate, the di-(ethyleneglycol) ester of terephthalic acid, or similar monomeric or dimeric precursors of polyethylene terephatalate. Similarly an "oligomer" of poly (m-xylylene adipamide) contains at most only minor amounts of adipic acid, m-xylenediamine, or the diamide comprising two m-xylenediamine residues bonded to the carboxylic acid groups of adipic acid, or similar monomeric or dimeric precursors of poly(m-xylylene adipamide). Preferably, the amorphous oligomeric resins of the present invention contain a total of less than about 5 weight percent monomeric, or dimeric polymer precursors. More preferably, the oligomeric resins contain a total of less than about 3, 2, 1, or 0.5 weight percent monomeric, or dimeric polymer precursors.

In some embodiments, especially those of condensation polymers wherein at least two distinct di-functional monomers (at least "A" monomers and "B" monomers) are necessary, an oligomer or an "oligomeric resin" preferably has an average degree of polymerization of at least four monomeric repeat units. The generic use of crystalline or semi-crystalline polyester or polyamides derived oligomers for the preparation of nanocomposites is disclosed in WO 00/34377, published Jun. 15, 2000, which is herein incorporated by reference in its entirety, for its disclosure regarding the preparation and utility of those classes of oligomeric resins in the formation of nanocomposites.

Preferred values for the I.V. or molecular weight of the oligomers depends on various factors including the composition of the oligomer, the matrix polymer, and the clay selected and is readily determined by those skilled in the art without excessive experimentation. Typically, the amorphous oligomers of the invention have a number average molecular weight of from about 200 to about 10,000 g/mol and may be a homo- or co-oligomer. Preferably, the amorphous oligomers have a number average molecular weight of from about 1000 to about 8000 g/mol. Preferably, the amorphous oligomers are co-oligomers. The I.V. of the oligomers prior to melt mixing is preferably from about 0.1 and 0.5 dL/g, and more preferably from 0.3 dL/g to 0.5 dL/g as measured in a mixture of 60 weight percent phenol and 40 weight percent 1,1,2,2-tetrachloroethane at a concentration of 0.5 g/100 ml (solvent) at 25° C.

Such amorphous oligomers have been found to very effective at dispersing an organo- or other suitable layered clay material to form a residue comprising an exfoliated nanocomposite. High dispersion of the layered clay material can be induced if the layered clay material is melt-mixed with the oligomers to form a concentrate, which is then "let down" in an extruder or other similar device with a high molecular weight matrix polymer. Alternatively, high dispersion of the layered clay material can also be obtained if the layered clay material, the oligomers, and the high molecular weight matrix polymer are essentially simultaneously melt-mixed in a "single step" mixing process.

While not wishing to be bound by theory, it is believed that the relatively low molecular weight and/or relatively low melting point of the amorphous oligomers of the invention aids the rate of their diffusion and/or insertion into the layered clay material, when compared to high molecular weight matrix polymers. The resulting increased penetration of the oligomers into the layered clay materials may therefore selectively improve the separation of the layered clay material to produce platelet particles, even when present at relatively low concentrations. This beneficial effect is believed to be independent of any later polymerization and/or increase in molecular weight of the oligomers, which is not believed to occur at a significant rate, or significantly affect the properties of the nanocomposites of this invention.

The amount of amorphous polymer or oligomer sufficient to overcome the nucleating effect of the clay that induces undesirably rapid crystallization of the matrix polymer will vary, depending on variables that include the selection of matrix polymer and selection and amounts of clays, clay treatments, and dispersing aids, and is readily ascertained by those skilled in the art. Typically less than about 25 percent by weight of amorphous polymer or oligomer is required, preferably less than about 20 weight percent of amorphous polymer or oligomer is used. Further, for compatibility with the matrix polymer, it is preferred that the amorphous polymeric or oligomeric resin and the high molecular weight matrix polymer have the same monomer unit.

The amorphous oligomers of the present invention are preferably oligomeric polyamides and/or polyesters. The oligomeric polyamide, for example, comprises the polycondensation polymerization reaction product (or residue) of at least one diamine component and at least one dicarboxylic acid component. In certain preferred embodiments, the amorphous oligomeric polyamides of the present invention comprise at least two dicarboxylic acid components, and/or at least two diamine components. While not wishing to be bound by theory, it is believed that the increase in disorder in the polymer chains induced by the presence of more than one dicarboxylic acid components or more than one two diamine component tends to induce amorphous physical properties in the resulting oligomers.

Although the preferred amorphous oligomers are linear or nearly linear, polymers and oligomers with other architectures, including branched, star, cross-linked and dendritic structures, may be used if desired.

The amorphous oligomers of the present invention are synthesized by methods generally known in the art for producing polymers. For example, oligomers of condensation polymers normally having at least two different monomer units in a 1:1 molar stoichiometry may be readily produced by unbalancing the 1:1 polymerization stoichiometry of amino and diacid end groups of the monomeric units employed during the polycondensation stage of the synthesis of a matrix polymer.

The amorphous oligomeric polyamides employed in this invention can be prepared in analogy to the methods described in U.S. Pat. No. 5,340,884, which is herein incorporated by reference in its entirety. For example, melt phase polymerization from a diacid-diamine complex may be employed, which may be prepared either in situ or in a separate step. In either method, diacids and diamines are used as starting materials. Alternatively, an ester form of the diacid may be used, preferably the dimethyl ester. If the ester is used, the reaction must be carried out at a relatively low temperature, generally 80.degree. to 120.degree. C., until the ester is converted to an amide. The mixture is then heated to the polymerization temperature. When the diacid-diamine complex is used, the mixture is heated to melting and stirred until equilibration.

The molecular weight of the amorphous oligomers are controlled by the diacid-diamine ratio. An excess of diamine monomers produces a higher concentration of terminal amino groups An excess of diacid monomers produces a higher concentration of terminal acid groups.

Diacid chlorides, esters, etc., can suitably be used. A solvent may be used in the preparation of the oligomers.

The amorphous oligomeric resins of the current invention do not comprise oligomeric (m-xylene adipamide) (i.e. oligomeric MXD6), which is a semi-crystalline, not amorphous material.

Clay Materials (Platelet Particles)

The nanocomposite composition of the present invention comprises less than about 25 weight percent, preferably from about 0.5 to about 20 weight percent, more preferably from about 0.5 to about 15 weight percent, and most preferably from about 0.5 to about 10 weight percent of a layered clay material. The layered clay material comprises or may be treated or dispersed to produce platelet particles. The amount of platelet particles is determined by measuring the amount of silicate residue in the ash of the polymer/platelet composition when treated in accordance with ASTM D5630-94.

Useful clay materials include natural, synthetic, and modified phyllosilicates. Natural clays include smectite clays, such as montmorillonite, saponite, hectorite, mica, vermiculite, bentonite, nontronite, beidellite, volkonskoite, magadite, kenyaite, and the like. Synthetic clays include synthetic mica, synthetic saponite, synthetic hectorite, and the like. Modified clays include fluoronated montmorillonite, fluoronated mica, and the like. Suitable clays are available from various companies including Nanocor, Inc., Southern Clay Products, Kunimine Industries, Ltd., and Elementis-Rheox.

Generally, the layered clay materials useful in this invention are an agglomeration of individual platelet particles that are closely stacked together like cards in a deck, in domains called tactoids. The individual platelet particles of the clays preferably have thickness of less than about 2 nm and diameter in the range of about 10 to about 3000 nm.

Preferably, the clays are dispersed in the polyamide so that most of the clay material exists as individual platelet particles, small tactoids, and small aggregates of tactoids. Preferably, a majority of the tactoids and aggregates in the residues comprising the polyamide/clay nanocomposites of the present invention will have thickness in its smallest dimension of less than about 20 nm. Polyamide/clay nanocomposite compositions with the higher concentration of individual platelet particles and fewer tactoids or aggregates are preferred.

Moreover, the layered clay materials are typically swellable free flowing powders having a cation exchange capacity from about 0.3 to about 3.0 milliequivalents per gram of mineral (meq/g), preferably from about 0.90 to about 1.5 meq/g, and more preferably from about 0.95 to about 1.40 meq/g. The clay may have a wide variety of exchangeable cations present in the galleries between the layers of the clay, including, but not limited to cations comprising the alkaline metals (group IA), the alkaline earth metals (group IIA), and their mixtures. The most preferred cation is sodium; however, any cation or combination of cations may be used provided that most of the cations may be exchanged for organic cations (onium ions). The exchange may occur by treating a individual clay or a mixture of clays with organic cations.

Preferred clay materials are phyllosilicates of the 2:1 type having a cation exchange capacity of 0.5 to 2.0 meq/g. In many embodiments, the clay materials are smectite clay minerals, particularly bentonite or montmorillonite, more particularly Wyoming-type sodium montmorillonite or Wyoming-type sodium bentonite having a cation exchange capacity from about 0.95 to about 1.25 meq/g. Such clays are readily available in the U.S. and other parts of the world including the Kunipia clays available from Kunimine Industries, Inc.

Other non-clay materials having the above-described ion-exchange capacity and size, such as chalcogens, may also be used as a source of platelet particles under the present invention. Chalcogens are salts of a heavy metal and group VIA (O, S, Se, and Te). These materials are known in the art and do not need to be described in detail here.

Improvements in gas barrier result from increases in the concentration of platelet particles in the polymer. While amounts of platelet particles as low as 0.01 percent provide improved barrier (especially when well dispersed and ordered), compositions having at least about 0.5 weight percent of the platelet particles are preferred because they display the desired improvements in gas permeability.

Prior to incorporation into the polyamide, the particle size of the clay material is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter.

The clay material of this invention may comprise refined but unmodified clays, modified clays or mixtures of modified and unmodified clays. Generally, it is desirable to treat the selected clay material to facilitate separation of the agglomerates of platelet particles to individual platelet particles and small tactoids. Separating the platelet particles prior to incorporation into the polymer also improves the polymer/platelet interface. Any treatment that achieves the above goals may be used. Many clay treatments used to modify the clay for the purpose of improving dispersion of clay materials are known and may be used in the practice of this invention. The clay treatments may be conducted prior to, during, or after mixing the clay material with the polymer.

Organic Cations

In an embodiment of this invention, an intercalated layered clay material is prepared by the reaction and/or treatment of a swellable layered clay material with a compound or composition comprising or capable of generating organic cation, preferably an ammonium compound (to effect partial or complete cation exchange). If desired, two or more organic cations may be used to treat a clay. Moreover, mixtures of organic cations may also be used to prepare an intercalated layered clay material, wherein the intercalated layered clay material in a polyamide nanocomposite comprises a mixture of intercalated clays. The process to prepare the organoclays (intercalated clays) may be conducted in a batch, semi-batch, or continuous manner.

Organic cations used to intercalate a clay material or a mixture of clay materials of a nanocomposite of this invention can be derived from organic cation salts, preferably onium salt compounds. Organic cation salts useful for the nanocomposite and process of this invention may generally be represented by the following formula (I):

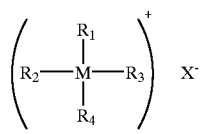

(I)

wherein M is either nitrogen or phosphorous; X⁻ is a halide, hydroxide, or acetate anion, preferably chloride and bromide; and $R_1$, $R_2$, $R_3$, and $R_4$ are independently organic and/or oligomeric ligands or may be hydrogen.

Examples of useful organic ligands include, but are not limited to, linear or branched alkyl groups having 1 to 22 carbon atoms, aralkyl groups which are benzyl and substituted benzyl moieties including fused-ring moieties having linear chains or branches of 1 to 100 carbon atoms in the alkyl portion of the structure, aryl groups such as phenyl and substituted phenyl including fused-ring aromatic substituents, beta, gamma unsaturated groups having six or less carbon atoms, and alkyleneoxide groups having repeating units comprising 2 to 6 carbon atoms. Examples of useful oligomeric ligands include, but are not limited to poly(alkylene oxide), polystyrene, polyacrylate, polycaprolactone, and the like.

Quaternary ammonium compounds are a preferred class of organic cations, especially quaternary ammonium cations containing one or two long chain alkyl groups having at least about 12 carbon atoms, such as octadecyl or tallow groups, one or more lower alkyl groups such as a methyl group, and one or two alkylene oxide groups having monomeric or repeating units comprising 2 to 6 carbon atoms.

Examples of useful organic cations include, but are not limited to alkyl ammonium ions, such as tetramethyl ammonium, hexyl ammonium, butyl ammonium, bis(2-hydroxyethyl) dimethyl ammonium, hexyl benzyl dimethyl ammonium, benzyl trimethyl ammonium, butyl benzyl dimethyl ammonium, tetrabutyl ammonium, di(2-hydroxyethyl) ammonium, and the like, and alkyl phosphonium ions such as tetrabutyl phosphonium, trioctyl octadecyl phosphonium, tetraoctyl phosphonium, octadecyl triphenyl phosphonium, and the like or mixtures thereof.

Other particularly useful organic cations for this invention include, but are not limited to alkyl ammonium ions such as dodecyl ammonium, octadecyl trimethyl ammonium, bis(2-hydroxyethyl) octadecyl methyl ammonium, octadecyl benzyl dimethyl ammonium, and the like or mixtures thereof.

Illustrative examples of suitable polyalkoxylated ammonium compounds include the hydrochloride salts of polyalkoxylated amines such as JEFFAMINE (of Huntsman Chemical), namely, JEFFAMINE-506 and JEFFAMINE 505, and an amine available under the trade name ETHOMEEN (of Akzo Chemie America), namely, ETHOMEEN 18/25, which is octadecyl bis(polyoxyethylene[15])amine, wherein the numbers in brackets refer to the average number of ethylene oxide units. A further illustrative example of a suitable polyalkoxylated ammonium compound is ETHOQUAD 18/25 (of Akzo Chemie America), which is octadecyl methyl bis(polyoxyethylene[15]) ammonium chloride.

Numerous methods to modify layered clays with organic cations are known, and any of these may be used in the practice of this invention. One embodiment of this invention is the organic modification of a layered clay with an organic cation salt by the process of dispersing a layered clay or mixture of clays into hot water, most preferably from 50 to 80° C., adding an organic ammonium salt (neat or dissolved in water or alcohol) or an organic amine and a Bronsted acid (thereby forming the organic ammonium salt in situ) or their combinations and mixtures with agitation, then blending for a period of time sufficient for the organic cations to exchange most of the metal cations present in the galleries between the layers of the clay material(s). Then, the organically modified layered clay material(s) is isolated by methods known in the art including, but not limited to, filtration, centrifugation, spray drying, and their combinations.

It is desirable to use a sufficient amount of the organic cation salt(s) to permit exchange of most of the metal cations in the galleries of the layered particle for the organic cation(s); therefore, at least about 0.5 equivalent of total organic cation salts is used and up to about 3 equivalents of organic cation salts can be used. It is preferred that about 0.5 to 2 equivalents of organic cation salts be used, more preferable about 1.0 to 1.5 equivalents. It is desirable, but not required to remove most of the metal cation salts and most of the excess organic cation salts by washing and other techniques known in the art.

Other Clay Treatments

The clay may be further treated for the purposes of aiding exfoliation in the composite and/or improving the strength of the polyamide/clay interface. Any treatment that achieves the above goals may be used. Examples of useful treatments include intercalation with water-soluble or water-insoluble polymers, organic reagents or monomers, silane compounds, metals or organometallics, and/or their combinations. Treatment of the clay can be accomplished prior to the addition of a polyamide to the clay material mixture, during the dispersion of the clay with the polyamide or during a subsequent melt blending or melt fabrication step.

Examples of useful pretreatment with polymers and oligomers include those disclosed in U.S. Pat. Nos. 5,552,469 and 5,578,672, incorporated herein by reference. Examples of useful polymers for treating the clay material include polyvinyl pyrrolidone, polyvinyl alcohol, polyethylene glycol, polytetrahydrofuran, polystyrene, polycaprolactone, certain water-dispersible polyesters, Nylon-6 and the like.

Examples of useful pretreatment with organic reagents and monomers include those disclosed in EP 780,340 A1, incorporated herein by reference. Examples of useful organic reagents and monomers for intercalating the swellable layered clay include dodecylpyrrolidone, caprolactone, caprolactam, ethylene carbonate, ethylene glycol, bishydroxyethyl terephthalate, dimethyl terephthalate, and the like or mixtures thereof.

Examples of useful pretreatment with silane compounds include those treatments disclosed in WO 93/11190, incorporated herein by reference. Examples of useful silane compounds includes (3-glycidoxypropyl)trimethoxysilane, 2-methoxy (polyethyleneoxy)propyl heptamethyl trisiloxane, octadecyl dimethyl (3-trimethoxysilylpropyl) ammonium chloride and the like.

If desired, a dispersing aid may be present during or prior to the formation of the composite by melt mixing for the purposes of aiding exfoliation of the treated or untreated swellable layered particles into the polyamide. Many such dispersing aids are known, covering a wide range of materials including water, alcohols, ketones, aldehydes, chlorinated solvents, hydrocarbon solvents, aromatic solvents, and the like or combinations thereof.

It should be appreciated that on a total composition basis, dispersing aids and/or pretreatment compounds may account for significant amount of the total composition, in some cases up to about 30 weight percent. While it is preferred to use as little dispersing aid/pretreatment compound as possible, the amounts of dispersing aids and/or pretreatment compounds may be as much as about 8 times the amount of the platelet particles.

Articles

The polyamide-clay nanocomposites of this invention may be formed into articles by conventional plastic processing techniques. Molded articles may be made from the above-described polyamides by compression molding, blow molding, or other such molding techniques, all of which are known in the art. Monolayer and/or multilayer articles prepared from the nanocomposite material of this invention include, but are not limited to film, sheet, pipes, tubes, profiles, molded articles, preforms, stretch blow molded films and containers, injection blow molded containers, extrusion blow molded films and containers, thermoformed articles and the like. The containers are preferably bottles.

The bottles and containers of this invention provide increased shelf storage life for contents, including beverages and food that are sensitive to the permeation of gases. Articles, more preferably containers, of the present invention often display a gas transmission or permeability rate (oxygen, carbon dioxide, water vapor) of at least 10% lower (depending on clay concentration) than that of similar containers made from clay-free polymer, resulting in correspondingly longer product shelf life provided by the container. Desirable values for the sidewall modulus and tensile strength may also be maintained. The articles also show unexpected resistance to haze formation, crystallization, and other defect formation.

The articles may also be multilayered. Preferably, the multilayered articles have a nanocomposite material disposed intermediate to other layers, although the nanocomposite may also be one layer of a two-layered article. In embodiments where the nanocomposite and its components are approved for food contact, the nanocomposite may form the food contact layer of the desired articles. In other embodiments, it is preferred that the nanocomposite be in a layer other than the food contact layer.

The multilayer articles may also contain one or more layers of the nanocomposite composition of this invention and one or more layers of a structural polymer. A wide variety of structural polymers may be used. Illustrative of structural polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrene, polyethylene-co-vinyl alcohols (EVOH), and the like or their combinations and blends. The preferred structural polymers are polyesters, such as poly(ethylene terephthalate) and its copolymers.

In another embodiment, co-extruding a layer of the polyamide-clay nanocomposite specified above with some other suitable thermoplastic resin may form articles. The polyamide-clay nanocomposite and the molded article and/or extruded sheet may also be formed at the same time by co-injection molding or co-extruding.

Another embodiment of this invention is the combined use of silicate layers uniformly dispersed in the matrix of a high barrier thermoplastic together with the multilayer approach to packaging materials. By using a layered clay to decrease the gas permeability in the high barrier layer, the amount of this material that is needed to generate a specific barrier level in the end application is greatly reduced.

Since the high barrier material is often the most expensive component in multilayer packaging, a reduction in the amount of this material used can be quite beneficial. With the polyamide-clay nanocomposite layer being sandwiched between two outer polymer layers, the surface roughness is often considerably less than for a monolayer nanocomposite material. Thus, with a multilayer approach, the level of haze may be further reduced.

In forming stretch blow molded bottles of one or several layers, it is often customary to initially form a preform of the desired vessel via an injection molding process. The crystallization rate of the materials comprising the preform must be sufficiently slow to allow the formation of an essentially noncrystalline article. Unless the preform is essentially noncrystalline, it is exceedingly difficult to stretch blow mold into the desired shape to form a bottle. In a key embodiment of this invention, the layered silicate materials and treatment compounds are selected both to promote dispersion of the individual platelets into the polymer, preferably polyamide, to allow maximum barrier enhancement, minimum haze formation, and the formation of preforms by injection molding which are essentially noncrystalline in character.

Processes

Many processes to prepare polymer-platelet particle compositions are known, and any of these processes may be used to prepare the composites of this present invention. Although any melt mixing device may be used, typically, the melt mixing step is conducted either by a batch mixing process or by a melt compounding extrusion process during which treated or untreated layered particles are introduced into a polyamide. Use of extrusion compounding to mix the clay and the oligomers and/or matrix polymer is preferred because of the ease of preparation and the potential to attain high clay loadings. Prior to melt mixing, the treated or untreated layered particles may exist in various forms including pellets, flakes, chips and powder. It is preferred that the treated or untreated layered particles be reduced in size by methods known in the art, such as hammer milling and jet milling.

This invention relates generally to a process comprising the steps of (1) preparing an amorphous polymeric and/or oligomeric resin-platelet particle composite by melt mixing platelet particles and an amorphous polymeric and/or oligomeric resin and (2) preparing a high molecular weight polymer-platelet particle (clay) nanocomposite material.

In a first embodiment, this invention relates to a process for preparing a polymer-clay nanocomposite comprising the steps of: (i) melt mixing a layered clay material with a matrix polymer-compatible amorphous oligomeric resin to form a resin-clay composite, and (ii) mixing the resin-platelet particle composite with a high molecular weight matrix polymer, producing a polymer nanocomposite material. It is not believed that the amorphous oligomeric resins of this invention are appreciably further polymerized or their molecular weights significantly increased during these melt-mixing steps.

Although any melt mixing device may be used, typically, the melt mixing step is conducted either by a batch mixing process or by a melt compounding extrusion process during which treated or untreated layered particles are introduced into an amorphous oligomeric or polymeric resin. Prior to melt mixing, the oligomeric or polymeric resin may exist in wide variety of forms including pellets, ground chips, powder and/or its molten state.

Referring to the first embodiment of this invention, in one embodiment, the melt mixing step may be achieved by dry mixing oligomeric or polymeric resin with treated or untreated layered particles then passing the mixture through a compounding extruder under conditions sufficient to melt the oligomeric or polymeric resin.

In another embodiment of the first embodiment, the melt-mixing step is conducted by feeding the amorphous oligomeric or polymeric resin and treated or untreated layered clay particles separately into a compounding extruder. When treated layered particles are used in this process, it is preferred that the resin be added first to minimize degradation of treated layered particles.

Use of extrusion compounding to mix the clay and the resin presents two advantages. Chiefly, the extruder is able to handle the high viscosity exhibited by the nanocomposite material. In addition, in a melt mixing approach for producing nanocomposite materials, the use of solvents can be avoided. Low molecular weight liquids can often be costly to remove from the nanocomposite resin.

The amorphous oligomeric or polymeric resin and the high molecular weight matrix polymer may have the same or different repeat unit structure, i.e., may be comprised of the same or different monomer units. Preferably, the resin has the same monomer unit to enhance compatibility or miscibility with the high molecular weight matrix polymer.

In another embodiment of this invention, molten amorphous oligomeric or polymeric resin may be fed directly to a compounding extruder along with treated or untreated layered particles to produce the resin-platelet particle composite.

If desired, a dispersing aid may be present during or prior to the formation of the composite by melt mixing for the purposes of aiding exfoliation of the treated or untreated swellable layered particles into the polymer. Many such dispersing aids are known, covering a wide range of materials including water, alcohols, ketones, aldehydes, chlorinated solvents, hydrocarbon solvents, aromatic solvents, and the like or combinations thereof.

Formation of a polymer-platelet particle (clay) nanocomposites may be achieved by several different methods. For polyesters, these include, but are not limited to melt compounding with melt processable polyester.

For polyamides, formation of a nanocomposite includes, but is not limited to melt compounding of an oligomeric polyamide composite with a high molecular weight, melt processable polyamide. The monomer unit of the melt processible polyamide may be the same as or different than the amorphous oligomeric polyamide.

In one embodiment of this invention, the melt mixing step is achieved by dry mixing polyamide matrix, amorphous polymer or oligomer, and treated layered particles then passing the mixture through a compounding extruder under conditions sufficient to melt the polyamide.

In another embodiment of this invention, the melt mixing step is conducted by feeding a polyamide matrix, amorphous polymer or oligomer, and treated layered particles separately into a compounding extruder. In one embodiment of this invention, an amorphous copolymer or oligomeric polyamide is melt-mixed with the treated clay to form a concentrate that is then melt mixed with a matrix polyamide. This process can be conducted in two separate steps in which the concentrate is isolated as a solid, or in a series of two steps in which the concentrate is used as a melt mixture, or in a single step in which the components are added either simultaneously or sequentially.

If desired the composites may be treated before, during or after the preparation of the composites of this invention for the purposes incorporating other fillers, additives, and reagents. Useful additives and reagents include, but are not limited to adhesive modifiers, oxygen scavenging catalysts, oxygen scavengers, toners, dyes, coloring agents, UV absorbers, mold release agents, impact modifiers, and their combinations. Useful fillers include, but are not limited to glass fibers, glass beads, talc, carbon black, carbon fiber, titanium dioxide, and the like or their combinations.

EXAMPLES

The following examples and experimental results are included to provide those of ordinary skill in the art with a complete disclosure and description of particular manners in which the present invention can be practiced and evaluated, and are intended to be purely exemplary of the invention and are not intended to limit the scope of what the inventors regard as their invention.

Efforts have been made to ensure accuracy with respect to numbers (e.g., amounts, temperature, etc.); however, some errors and deviations may have occurred. Unless indicated otherwise, parts are parts by weight, temperature is in ° C. or is at ambient temperature, and pressure is at or near atmospheric.

Comparative Example 1

A low molecular weight semi-crystalline poly(m-xylylene adipamide) was prepared and determined to possess a number average molecular weight of about 3,000 (by titration of the amine and carboxylate end groups) and to have an I.V. of about 0.415 dL/g. 1625 grams (81 wt %) of this oligomeric poly(m-xylylene adipamide) was dry mixed with 376 grams (19 wt %) of 1.28MC, an organoclay available from Nanocor, Inc., then dried at 80 C. overnight in a vacuum oven. The mixture was then extruded on the Leistritz Micro 18 co-rotating twin screw extruder equipped with a general compounding screw. The AccuRate pellet feeder was set at a 10 rpm, a rate of approximately 4 kg/hr, with a nitrogen atmosphere over both the feeder and the hopper. The barrel and die temperatures were set at 235° C. for zone 1, 240° C. for zones 2 through 6, 245° C. for zone7, and 250° C. for zone 8. The screw rotation was approximately 250 rpm. The material was air-cooled on a casting belt then pelletized as it exited the extruder. After the extrusion was complete, 155.6 grams (16 wt %) of the pellets were dry-mixed with 845.0 grams (84 wt %) of MXD6 6007 polyamide, of Mitsubishi Gas Company. The mixture was then extruded on the Leistritz extruder under the same conditions used with the clay polymer mixture except that the temperature at zone I was 240° C., the temperature at zones 2 through 8 was 260° C., and the AccuRate feeder was set at 4.0 rpm, a feed rate of about 2 kg/hour.

The material obtained was determined to comprise 2.0 wt % ash due to the clay. The material obtained was characterized by optical microscopy (OM), transmission electron microscopy (TEM), and wide angle X-ray diffraction (WAXD) to determine the degree of dispersion of the organoclay into the polymer matrix and to assess the morphology of the composite material. It was determined that the composite material exhibits a high degree of clarity, the clay is well distributed into the matrix of the polymer, and most of the clay is exfoliated into individual layers and small tactoids. The crystallization characteristics of this material were analyzed using differential scanning calorimetry. The $T_m$ is 237° C. with $\Delta H$=13 cal/g, and the $T_{cc}$–$T_{ch}$ is 41.

A trilayer film was extruded comprising an internal layer of 22 vol. % of this composite with two external layers of PET-9921, available from Eastman Chemical Company. The oxygen permeability of the film was then determined on a Mocon Oxatran 2/20 to be 1.3 cc-mil/100 in$^2$-day-atm. A 4-inch square section of the trilayer film was stretched on a T. M. Long instrument (4×4 orientation at about 110° C.). The percent haze of the oriented film was determined to be 6.8% and the oxygen permeability was determined to be 0.63 cc-mil/100 in$^2$-day-atm.

Comparative Example 2

The procedure of Comparative Example 1 was repeated except the of the materials weighed were adjusted to 233 grams (23 wt %) of the extrudate pellets and 767 grams (77 wt %) of the MXD6 6007 to give a composite comprising 3.0 wt % ash. The results are shown in Table 2 hereinbelow.

Comparative Example 3

The procedure of Comparative Example 1 was repeated except the amount of the materials weighed were adjusted to 78 grams (8 wt %) of the extrudate pellets and 923 grams (92 wt %) of the MXD6 6007 to give a composite comprising 1.0 wt % ash. The results are shown in Table 2 hereinbelow.

Example 1

The procedure of Comparative Example 1 was repeated using a low molecular weight amorphous poly(m-xylylene adipamide-co-m-xylylene isophthalamide) 50/50 copolymer with I.V. of about 0.48 dL/g instead of the low molecular weight poly(m-xylylene adipamide). The amorphous poly (m-xylylene adipamide-co-m-xylylene isophthalamide) can be prepared in analogy to the method disclosed in Example 12 of U.S. Pat. No. 5,340,884. 724 grams (83 wt %) of this oligomeric poly(m-xylylene adipamide-co-m-xylylene isophthalamide) was dry mixed with 153 grams (17 wt %) of 1.28 MC, available from Nanocor, Inc., then dried at 75° C. over a weekend in a vacuum oven. The mixture was then extruded on the Leistritz: Micro 18 corotating twin screw extruder equipped with a general compounding screw. The AccuRate pellet feeder was set at a 4 rpm, a feed rate of about 2.0 kg/hr, with a nitrogen atmosphere over both the feeder and the hopper. The barrel and die temperatures were set at 235° C. for zone 1, 250° C. for zones 2 through 6, and 260° C. for zones 7 and 8, and the screw rotation was approximately 300 rpm. After the extrusion was complete, 803 grams (17 wt %) of the extrudate pellets were dry mixed with 4009 grams (83 wt %) of MXD6 6007 polyamide, available from Mitsubishi Gas Company. The mixture was then extruded on the Leistritz extruder under the same conditions used with the clay polymer mixture except that the temperature at zone 1 through 6 were at 250° C., zones 7 and 8 was 260° C., and the AccuRate feeder was set at 3.5 rpm, a feed rate of slightly less than about 2 kg/hour. The results are shown in Table 2.

The material obtained was determined to comprise 2.1 wt % ash due to the clay. The material obtained was then characterized by optical microscopy (OM), transmission electron microscopy (TEM), and wide angle X-ray diffraction (WAXD) to determine the degree of dispersion of the organoclay into the polymer matrix and to assess the morphology of the composite material. It was determined that the composite material exhibits a high degree of clarity, the clay is well distributed into the matrix of the polymer, and most of the clay is exfoliated into individual layers and small tactoids. The crystallization characteristics of this material were analyzed using differential scanning calorimetry. The $T_m$ is 234° C. with $\Delta H$=11 cal/g, and the $T_{cc}-T_{ch}$ is 9, demonstrating a significant reduction in the crystallization rate with little if any reduction of the melting point and percent crystallinity.

A trilayer film was extruded comprising an internal layer of 21 vol. % of this composite with two external layers of PET-9921, available from Eastman Chemical Company. The oxygen permeability of the film was then determined on a Mocon Oxatran 2/20 to be 0.17 cc-mil/100 in²-day-atm, demonstrating a significant improvement in barrier. A 4-inch square section of the trilayer film was stretched using a T. M. Long instrument (4×4 orientation at about 110° C.). The percent haze of the oriented film was determined to be 2.9% and the oxygen permeability was determined to be 0.56 cc-mil/100 in²-day-atm.

Example 2

The procedure of Comparative Example 1 was repeated using a low molecular weight amorphous poly(m-xylylene diglycolamide) with I.V. of 0.30 dL/g. 165 grains (83 wt %) of this oligomeric poly (m-xylylene diglycolamide) was dry mixed with 35 grams (17 wt %) of 1.28 MC, available from Nanocor, Inc. After the extrusion was complete, 185 grains (19 wt %) of the extrudate pellets were dry-mixed with792 grams (81 wt %) of MXD6 6007 polyamide, available from Mitsubishi Gas Company. The mixture was then extruded on the Leistritz extruder under the same conditions used with Example 1. The results are shown in Table 1. The material obtained was determined to comprise 2.0 wt % ash due to the clay. The material obtained was then characterized by optical microscopy (OM), transmission electron microscopy (TEM), and wide angle X-ray diffraction (WAXD) to determine the degree of dispersion of the organoclay into the polymer matrix and to assess the morphology of the composite material. It was determined that the composite material exhibits a high degree of clarity, the clay is well distributed into the matrix of the polymer, and most of the clay is exfoliated into individual layers and small tactoids. The crystallization characteristics of this material were analyzed using differential scanning calorimetry. The $T_m$ is 235° C. with $\Delta H$=12 cal/g, and the $T_{cc}-T_{ch}$ is 25, demonstrating a significant reduction in the crystallization rate with little if any reduction of the melting point and percent crystallinity.

A trilayer film was extruded comprising an internal layer of 21 vol. % of this composite with two external layers of PET-9921, available from Eastman Chemical Company. The oxygen permeability of the film was determined to be 0.62 ccmil/100 in²-day-atm, demonstrating a significant improvement in barrier. A 4-inch square section of the trilayer film was stretched using a T. M. Long instrument (4×4 orientation at about 110° C.). The percent haze of the oriented film was determined to be 2.9% and the oxygen permeability was determined to be 0.62 cc-mil/100 in²day-atm.

The benefits of using a copolymer or oligomer are demonstrated in Table 2 attached hereinbelow. Table 1 shows the observed values of $T_{cc}-T_{ch}$ and oxygen permeabilities and haze for trilayer films (with PET 9921 of Eastman Chemical Company outer layers) comprising neat MXD6 and MXD6-clay composites comprising a crystallizable polyamide oligomers, see Comparative Examples 1–3. The results show that using crystallizable oligomers provides significant barrier improvement, as indicted by reduced oxygen permeability, but also increases the crystallization rate, as indicated by an increase in the value of $T_{cc}-T_{ch}$ and greatly increased haze, especially after orientation. Table 1 also shows the observed values of $T_{cc}-T_{ch}$ and oxygen permeabilities of trilayer film (with PET 9921 outer layers) for MXD6-clay composites comprising amorphous polyamide oligomers and amorphous polyesters, see Examples 1 and 2. The results show that using amorphous oligomers or polymers reduces the crystallization rate, as indicated by a decrease in the value of $T_{cc}-T_{ch}$ without significantly reducing the melting point or percent crystallinity of the matrix, as indicated by $T_m$, and $\Delta H$, while achieving superior barrier, as indicted by reduced oxygen permeability and maintaining an acceptably low amount of haze. Thus, it is surprising that the use of an amorphous oligomer with a layered clay material provides composites that have the desired crystallinity with reasonable crystallization rates, improved barrier, and reduced haze.

Pfleiderer) equipped with a general compounding screw. The barrel and die temperatures are set at about 270° C.

TABLE 2

| | Composition Variables | | Thermal Properties | | | Vol. % | Trilayer Film Properties | |
|---|---|---|---|---|---|---|---|---|
| | | | | | | | Oxygen Permeability unoriented/oriented | |
| Example | Copolymer or Oligomer | Wt % Clay | $T_{cc}$–$T_{ch}$ (° C.) | $T_m$ (° C.) | $\Delta H$ (cal/g) | Barrier Layer | (cc-mil/100 in$^2$-day-atm) | % Haze |
| MXD6 Control | None | None | 34 | 236 | 13 | 22 | 1.5/0.94 | 1.5 |
| Comparative Example 1 | Crystallizable polyamide oligomer | 2.0 | 41 | 237 | 13 | 22 | 1.3/0.63 | 6.8 |
| Comparative Example 2 | Crystallizable polyamide oligomer | 3.0 | 45 | 237 | 13 | 29 | 0.72/0.58 | 7.3 |
| Comparative Example 3 | Crystallizable polyamide oligomer | 1.1 | 34 | 237 | 12 | 28 | 1.1/0.68 | 1.9 |
| Example 1 | Amorphous polyamide oligomer | 2.1 | 9 | 234 | 11 | 21 | 0.17/0.56 | 2.9 |
| Example 2 | Amorphous polyamide oligomer | 2.0 | 25 | 235 | 12 | 21 | 0.62/0.62 | 2.9 |

Example 3

Example 3 illustrates a "one-step" process for the preparation of the nanocomposites of the invention. In this example all the three ingredients, a pre-treated organoclay, an amorphous oligomeric resin, and the matrix polymer are all fed at the throat-end of the extruder feed in a "one step" process.

A matrix polymer, MXD6 6007, poly(m-xylylene adipamide) with an I.V. of about 1.1 dL/g, can be purchased from Mitsubishi Chemical Co.

An organo-montmorillonite clay starting material, (such as Nanomer, I34.MN) can be provided by Nanocor Inc. of Arlington Heights, Ill., or prepared by a process similar to the following. A starting montmorillonite layered clay material may be purified by the process described in U.S. Pat. No. 6,050,509. The organo-montmorillonite clay is then prepared by onium ion exchanging the purified Na-montmorillonite with bis(2-hydroxyethyl) octadecyl methyl ammonium chloride. The finished organo-clay product is washed with alcohol/water mixture to remove excess surfactant, then dried and milled. The organic cation which is thereby ion-exchanged for most of the original sodium cations of the clay is bis(2-hydroxyethyl) octadecyl methyl ammonium.

An oligomeric amorphous poly(m-xylylene adipamide-co-m-xyleylene isophthalamide) co-polyamide is prepared in analogy to the procedure described in WO 00/34372, in combination with unbalancing the polymerization stoichiometry of the monomeric components from 1:1, as described therein. This material is analyzed by titration of the amine and carboxylate end groups, and preferably determined to possess an appropriate number average molecular weight of about 3,000, and an I.V. of about 0.4 dL/g.

The starting materials for the "one step" process, i.e., about 20.4% by weight of the oligomeric resin, 4.6% of organo-montmorillonite clay from Nanocor, Inc. and 75% by wt. of MXD6-6007 from Mitsubishi Chemical Co. are then extruded on a 57 mm twin screw extruder (Werner The resulting nanocomposite material, can be used as the middle layer of co-injected trilayer preform. The inner and outer layers of the trilayer preform can be made from Eastman Chemical Company PET 9921W, having about 0.80 dL/g I.V. The nominal thickness of the middle layer is about 10% of the total thickness. The preforms can be stretch blow molded on a Side1 SBO 2/3 machine into 16 oz. bottle.

Throughout this application, various publications are referenced. The disclosures of these publications in their entireties are hereby incorporated by reference into this application in order to more filly describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer-clay nanocomposite comprising:
   (a) a matrix polymer;
   (b) an amorphous oligomer; and
   (c) a layered clay material, or residue thereof;
   wherein the polymer-clay nanocomposite does not simultaneously comprise
   (i) an amorphous matrix polyamide comprising (a) a residue of at least one dicarboxylic acid component and (b) a residue of at least one diamine component; or poly(m-xylylene adipamide) and
   (ii) an amorphous matrix polyamide-compatible oligomeric resin, or oligomeric (m-xylylene adipamide).

2. The nanocomposite of claim 1, wherein component (a) comprises a polyester, polyetherester, polyamide, polyesteramide, polyurethane, polyimide, polyetherimide, polyurea, polyamideimide, polyphenyleneoxide, phenoxy resin, epoxy resin, polyolefin, polyacrylate, polystyrene, polyethylene-co-vinyl alcohol, or a mixture thereof.

3. The nanocomposite of claim 1, wherein component (a) comprises a crystalline or semi-crystalline polyamide.

4. The nanocomposite of claim 1, wherein component (a) comprises poly(m-xylylene adipamide).

5. The nanocomposite of claim 1, wherein component (b) comprises an amorphous oligomeric polyamide.

6. The nanocomposite of claim 1, wherein component (a) and component (b) have the same monomer unit.

7. The nanocomposite of claim 1, comprising greater than zero to about 25 weight percent of the layered clay material.

8. The nanocomposite of claim 1, comprising from about 0.5 to about 15 weight percent of the layered clay material.

9. The nanocomposite of claim 1, wherein the layered clay material comprises montmorillonite, saponite, hectorite, mica, vermiculite, bentonite, nontronite, beidellite, volkonskoite, magadite, kenyaite, or a mixture thereof.

10. The nanocomposite of claim 1, wherein the layered clay material comprises Wyoming sodium montmoriulonite or Wyoming sodium bentonite.

11. The nanocomposite of claim 1, wherein the layered clay material is treated with a water soluble or insoluble polymer, an organic reagent or monomer, a silane compound, a metal, an organometallic, an organic cation to effect cation exchange, or a combination thereof.

12. The nanocomposite of claim 1, wherein the layered clay material is treated with an organic cation represented by the formula:

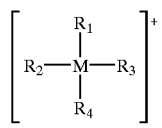

wherein M is either nitrogen or phosphorous, and $R_1$, $R_2$, $R_3$, and $R_4$ are independently organic and/or oligomeric ligands or hydrogen.

13. The nanocomposite of claim 1, prepared by a process of mixing components (a), (b), and (c).

14. An article prepared from the nanocomposite of claim 1.

15. The article of claim 14 in the form of film, sheet, pipe, fiber, preform, profile, an extruded article, a molded article or a molded container.

16. The article of claim 14 in the form of a bottle.

17. A process for preparing a polymer-clay nanocomposite comprising the steps of:
   (a) melt mixing a layered clay material with an amorphous oligomeric resin, to form an oligomeric resin-clay composite; and
   (b) mixing the oligomeric resin-clay composite with a matrix polymer to produce the polymer-clay nanocomposite;
   wherein the polymer-clay nanocomposite does not simultaneously comprise
      (1) an amorphous matrix polyamide comprising (i) a residue of at least one dicarboxylic acid component and (ii) a residue of at least one diamine component; or poly(m-xylylene adipamide) and
      (2) an amorphous matrix polyamide-compatible oligomeric resin, or oligomeric (m-xylylene adipamide.

18. The process of claim 17, wherein step (b) is conducted by a batch mixing or a melt compounding extrusion process.

19. The process of claim 17, wherein the amorphous oligomeric resin and the matrix polymer have the same monomer unit.

20. The process of claim 17, wherein the amorphous oligomeric resin is an oligomeric polyamide.

21. A nanocomposite material produced by the process of claim 17.

22. An article prepared from the nanocomposite material of claim 21.

23. The article of claim 22 in the form of film, sheet, fiber, preform, profile, an extruded article, a molded article, or a molded container.

24. The article of claim 22 in the form of a bottle.

25. A process for preparing polymer-clay nanocomposite comprising melt mixing a layered clay material, an amorphous oligomeric resin, and a matrix polymer, to produce the polymer-clay nanocomposite material, wherein the polymer-clay nanocomposite does not simultaneously comprise
   (a) an amorphous matrix polyamide comprising (i) a residue of at least one dicarboxylic acid component and (ii) a residue of at least one diamine component, or poly(m-xylylene adipamide); and
   (b) an amorphous matrix polyamide-compatible oligomeric resin, or oligomeric (m-xylylene adipamide).

26. The polymer-clay nanocomposite produced by the process of claim 25.

27. A polyamide-clay nanocomposite comprising:
   (1) a high molecular weight matrix polyamide, and incorporated therein
   (2) a layered clay material, wherein the clay material is dispersed in a matrix polyamide-compatible amorphous oligomeric resin.

28. The nanocomposite of claim 27, wherein the polymer-clay nanocomposite does not simultaneously comprise
   (a) an amorphous matrix polyamide comprising (i) a residue of at least one dicarboxylic acid component and (ii) a residue of at least one diamine component; or poly(m-xylylene adipamide) and
   (b) an amorphous matrix polyamide-compatible oligomeric resin, or oligomeric (m-xylylene adipamide).

29. The nanocomposite of claim 28, wherein component (i) comprises poly(m-xylylene adipamide).

30. The nanocomposite of claim 28, wherein the oligomeric resin is not oligomeric (m-xylylene adipamide).

* * * * *